(12) United States Patent
Liaw et al.

(10) Patent No.: US 6,530,062 B1
(45) Date of Patent: Mar. 4, 2003

(54) ACTIVE IMPEDANCE COMPENSATION

(75) Inventors: Haw-Jyh Liaw, Fremont, CA (US);
Donald V. Perino, Los Altos, CA (US);
Pak Shing Chau, San Jose, CA (US);
Kevin S. Donnelly, Los Altos, CA (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/523,520

(22) Filed: Mar. 10, 2000

(51) Int. Cl.$^7$ .............................................. G06F 17/50
(52) U.S. Cl. ...................... 716/2; 716/2; 716/5; 716/12
(58) Field of Search .................. 379/404, 413; 364/807; 716/5, 2, 3, 4, 12; 326/30; 427/569

(56) References Cited

U.S. PATENT DOCUMENTS

| | | | | |
|---|---|---|---|---|
| 5,249,225 A | * | 9/1993 | Williams | ..................... 379/404 |
| 5,254,883 A | * | 10/1993 | Horowitz | ..................... 326/30 |
| 5,574,678 A | * | 11/1996 | Gorecki | ..................... 364/807 |
| 6,212,274 B1 | * | 4/2001 | Ninh | ..................... 379/413 |
| 6,313,584 B1 | * | 11/2001 | Johnson et al. | ............. 427/569 |

\* cited by examiner

Primary Examiner—Matthew Smith
Assistant Examiner—Thuan Do
(74) Attorney, Agent, or Firm—Pennie & Edmonds LLP

(57) ABSTRACT

Active impedance compensation is accomplished in a bus system by means of a variable capacitor element associated with a connection circuit between system slave devices and an impedance balanced channel. The variable capacitor elements may be programmed using a control value determined by actively exercising the channel with a telemetry signal and evaluating the resulting signal reflections which are indicative of the impedance discontinuities on the channel.

30 Claims, 10 Drawing Sheets

ACTIVE IMPEDANCE COMPENSATION

BACKGROUND OF THE INVENTION

The present invention relates to a method and a corresponding circuit for providing active impedance compensation. More particularly, the present invention relates to a system and method by which a circuit connecting a slave device to a high speed bus incorporates means for actively providing impedance compensation.

A contemporary bus system is conceptually illustrated in FIG. 1. Within this system a master 10 having an interface 14 is connected to a channel 12 which terminates in one or more termination resistors 13. One or more slave devices 11 are also connected to channel 12 between master 10 and termination resistor(s) 13. Channel 12 comprises a plurality of signal lines communicating data and control information between master 10 and the slave devices 11.

The exemplary bus system shown in FIG. 1 is implemented on a printed circuit board (PCB). That is, master 10 and slave devices 11 are mounted on the PCB, and the signal lines forming channel 12 are implemented, at least in part, by metal traces formed on the PCB.

Ideally this bus system is implemented with carefully balanced (or matched) impedances. By matching the impedance of master interface 14 and termination resistor(s) 13, as well as the effective impedance of the signal lines forming channel 12, signals transmitted between master 10 and slave devices 11 do not result in unwanted signal reflections which reduce the signal to noise ratio on the channel.

The signal lines forming channel 12 may be described according to the model shown in FIG. 2A, where the electrical characteristics of each signal line are expressed as an inductance component LPCB and a capacitive component CPCB. From this model, signal line impedance (Z) may be expressed as:

$$Z = (LPCB/CPCB)^{1/2} \quad (1)$$

where LPCB and CPCB are the per unit length inductance and capacitance of the PCB trace.

When there are devices connected to the PCB trace with regular spacing, the impedance changes due to device loading. The loading effects of each slave device connection to a signal line may be described in relation to the model shown in FIG. 2B. Here, the loading effects are represented by the series combination of Li, Ci, and Ri placed in parallel with $C_{PCB}$. For the signal frequencies presently contemplated, the loading effects of Ci predominate over Li and Ri. Accordingly, the electrical behavior of the loaded signal line may be understood from the model shown in FIG. 2C. Channel impedance ($Z_{ch}$) may be expressed as:

$$Z_{ch} \sim \{L_{PCB}/+[C_{PCB}+(Ci \div \text{pitch})]\}^{1/2} \quad (2)$$

where pitch is the length of the signal lines between slave devices and Ci is the total input capacitance of a slave device.

In view of the foregoing, system designers may vary the impedance of the signal line traces on the PCB and the device pitch in order to define a nominal channel having a specific target impedance. The term "target" is used because in reality some amount of variation around the nominal impedance occurs due to process variations in the manufacture of the PCB and the various bus system components. Currently, such impedance variations may be controlled to within +/−10% of the target impedance.

As is well understood by those of ordinary skill in the art, a signal traversing a transmission line having impedance variations or discontinuities will generate unwanted signal reflections. This phenomenon is further illustrated in FIG. 3.

FIG. 3 conceptually illustrates the transmission line of the channel between master 10 and termination resistor(s) 13. Channel 12 (shown in dashed line) comprises a number of PCB portions, i.e., those portions of the channel formed by signal line traces on or through PCB 20 having a first impedance Z1, and a number of module portions, i.e., those portions of the channel formed by signal lines integral to connected daughterboard modules having a second impedance Z2. Despite design attempts to match Z1 and Z2, variations in PCB manufacturing processes typically result in impedance discontinuities between the channel portions characterized by Z1 and Z2.

When a signal traverses these impedance discontinuities a number of discrete signal reflections Sf1 . . . Sfn result, as shown in relation to the model transmission line 30 of FIG. 3. The effect of these unwanted signal reflections is illustrated in FIGS. 4A through 4D. The single pulse signal shown in FIG. 4A when introduced into the bus system of FIG. 3 may produce the signal shown in 4B when influenced by the unwanted signal reflections. Similarly, the input signal shown in FIG. 4C might produce the signal shown FIG. 4D.

Such resulting signals may occur, for example, when the multiple impedance discontinuities shown in FIG. 3 occur at spacings which correspond to odd multiples of the input signal's quarter wavelength. In such a circumstance, the unwanted reflections tend to add up constructively. Such constructive interference of multiple reflections leads to large timing and voltage errors on the channel. Analogously, destructive interference of multiple reflections can reduce signal margins and lead to a loss of signal coherency.

SUMMARY OF THE INVENTION

The present invention addresses the problem of unwanted reflections on a channel of a bus system. Stated in another way, the present invention provides a system and method by which channel impedance discontinuities may be identified, quantified and compensated.

For example, one aspect of the present invention provides a connection circuit between a slave device and a channel signal line. The connection circuit includes an output transistor driving data from the slave device onto the signal line and a variable capacitor element responsive to a control signal and positioned between the output transistor and the signal line. The connection circuit may also include an electro-static discharge circuit between the output transistor and the signal line.

The slave device may further include a control register storing a control value. However, the control register may be placed in the master. Wherever stored, the control value may be used to define a control signal which determines the capacitance of the variable capacitor element.

In one preferred embodiment, the variable capacitor element comprises a metal-oxide semiconductor (MOS) transistor controlled by an analog control signal. The analog control signal is a voltage signal generated by an digital-to-analog converter receiving the control value from the control register. However, in other embodiments the variable capacitor element comprises an array of transistors selected in accordance with the control signal, or an array of capacitors selected in accordance with the control signal.

In another aspect, the present invention provides a method of impedance compensation in a bus system comprising a master and one or more slave devices mounted on a printed circuit board and connected via a channel, the method comprising; measuring the actual channel impedance of the mounted slave device, comparing the actual channel impedance to a target impedance, defining a control value in accordance with the comparison of the actual channel impedance to the target impedance, and storing the control value in a serial programming device (SPD) on the slave device. This method may also comprise the steps of reading the control value from the SPD during an initialization routine, storing the control value in a control register on the slave device, and adjusting the impedance of one or more connection circuits on the slave device in response to the control value.

In yet another aspect, the present invention provides a method of determining and programming an impedance compensation circuit in a bus system comprising a master and one or more slave devices connected via a channel, the method comprising transmitting a telemetry signal onto the channel, detecting a response to the telemetry signal in the master, evaluating the response, and programming the impedance compensation circuit in accordance with the evaluation of the response.

Where the slave device comprises a control register and the impedance compensation circuit includes a variable capacitor element, the step of programming the impedance compensation circuit may include; determining a control value in accordance with the evaluation of the response, storing the control value in the control register, defining a control signal within the slave device in accordance with the control value, and adjusting the capacitance of the variable capacitor element in response to the control signal.

Where the variable capacitor element comprises a metal-oxide semiconductor (MOS) transistor, the step of defining a control signal may further include; applying the control value from the control register to an digital-to-analog (D/A) converter and generating an analog control voltage, and applying the analog control voltage to the MOS transistor.

The telemetry signal may be a single step signal, single bit signal, or a pseudo-random data signal, and the step of detecting a response to the telemetry signal may include detecting one or more signal reflections caused by interreaction of the telemetry signal with one or more impedance discontinuities in the channel.

DESCRIPTION OF THE INVENTION

Figure 1:
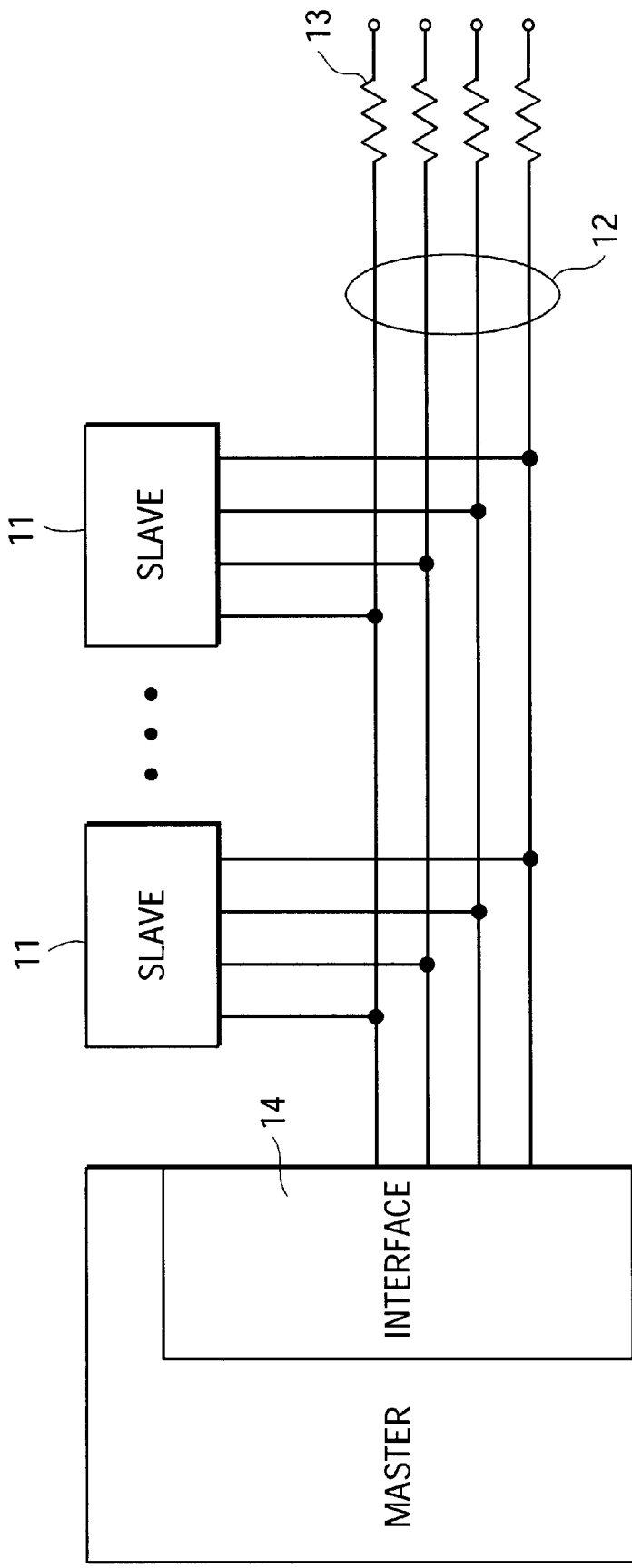
FIG. 1 conceptually illustrates an exemplary bus system.
Figure 2A:
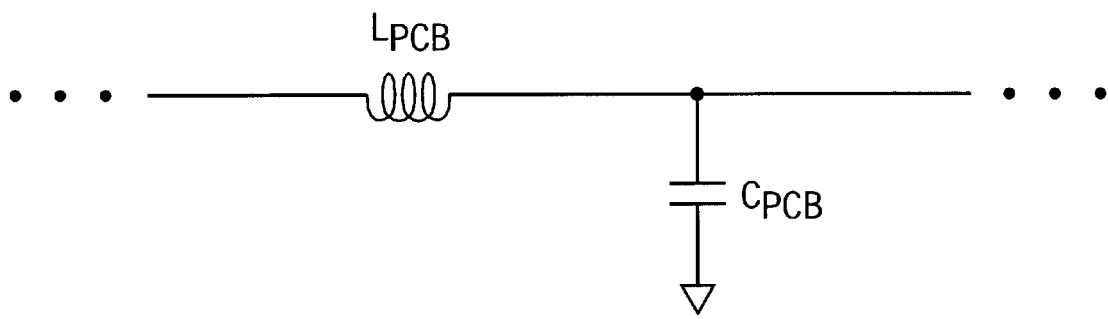
FIGS. 2A, 2B and 2C are electrical models for the channel signal lines of the bus system shown in FIG. 1.
Figure 2B:
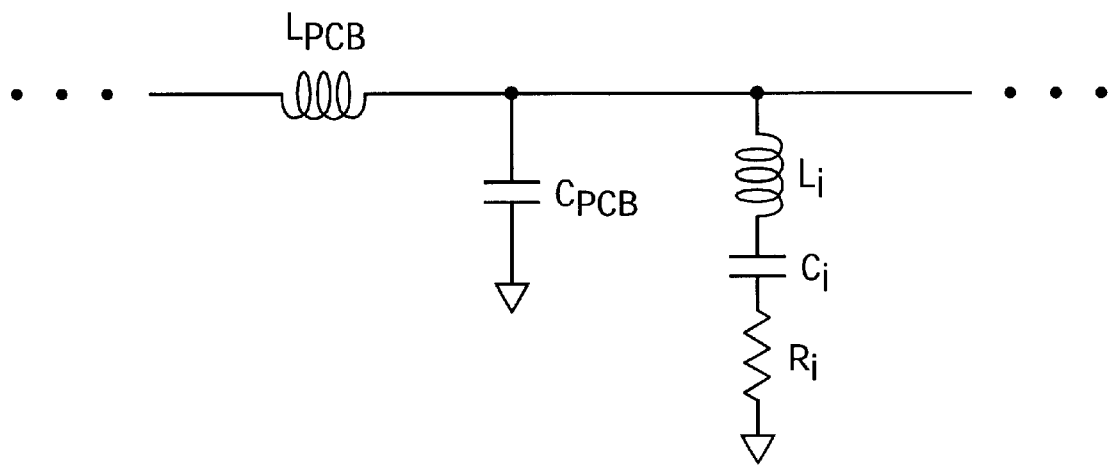
Figure 2C:
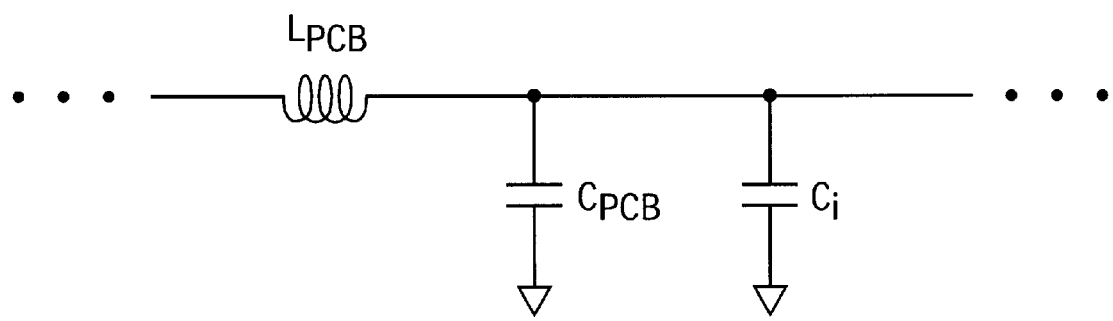

The total input capacitance for a slave device, Ci, described above is a very well understood design parameter within contemporary bus systems like the one illustrated in FIG. 1. Total input capacitance, Ci, is measurable, and may be managed by manipulation of one or more of the design aspects contributing to the total input capacitance for a slave device. For example, the length of the output transistor, or the structure of an associated electrostatic discharge (ESD) circuit may be altered to define a desired Ci.

The per unit length capacitance and inductance of one or more PCB traces are, however, not readily controllable by the bus system designer, or the slave device designer. In fact, the PCB is typically manufactured by one or more vendors and provided to the bus system integrator. Process variations from vendor to vendor and from batch to batch ensure a stream of channel signal traces having variable per unit length capacitance.

Accordingly, one aspect of the present invention is directed to the active compensation of variations in the per unit length capacitance (CPCB) and inductance (LPCB) of signal traces on PCBs forming the channel of a bus system. The circuit or component used to compensate for CPCB and LPCB is preferably resident in a "connection circuit" between the slave device and the signal line. The connection circuit may take many specific forms. The example given below draws some arbitrary lines between the physical elements forming the electrical signal path between the slave device and the signal line. Those of ordinary skill in the art will recognize that the nature of the slave device, which might be a memory device, a logic device, or a transceiver, will dictate the exact nature and layout of the connection circuit. Signaling protocols, as well as signal conversion (form or level) might also influence the many specific designs for a competent connection circuit.

Figure 5:
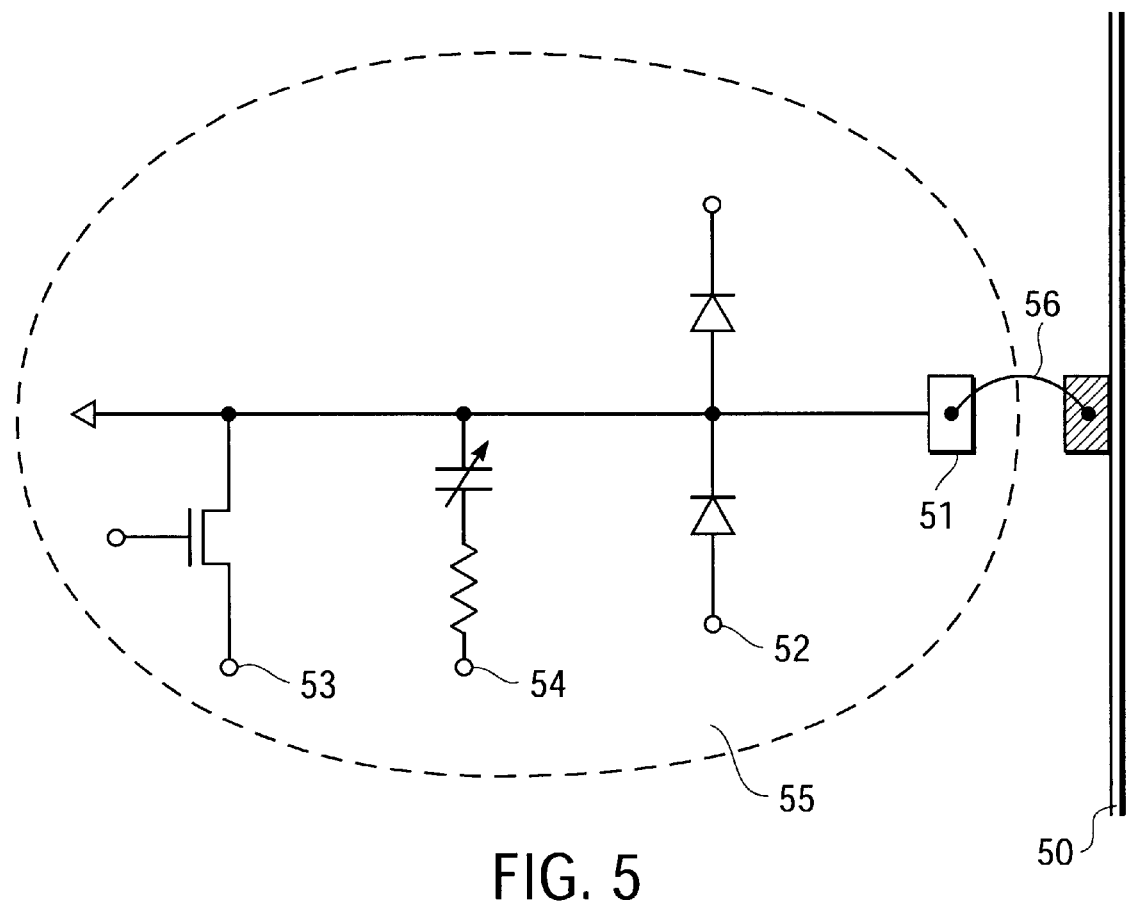
FIG. 5 illustrates a connection circuit according to the present invention which incorporates a variable capacitor element.

In the example that follows, it is assumed that each pin of the slave device has a corresponding connection circuit. However, this need not be the case. Compensation for PCB variation may be accomplished across a plurality of pins using one or more circuits. With this in mind, an exemplary connection circuit associated with at least one input is shown in FIG. 5. Connection circuit 55 connects the slave device to signal line 50 via a package wire 56 and pad 51. Connection circuit 55 comprises an output transistor 53 driving data onto signal line 50, and an ESD circuit 52 is located between pad 51 and output transistor 53. Connection circuit 55 may also connect a slave device receiver (not shown) to signal line 50. In one aspect of the present invention, a variable capacitor element 54 is placed between ESD circuit 52 and output transistor 53. However, those of ordinary skill in the art will appreciate that the variable capacitor element may be placed in any reasonable location associated with an input/output (I/O) pin. For example, the variable capacitor element might be connected to an input-only pin associated with a receiver. Wherever the variable capacitor element is connected, a bus system according to the present invention may use this element to compensate for PCB impedance variations.

Figure 6:
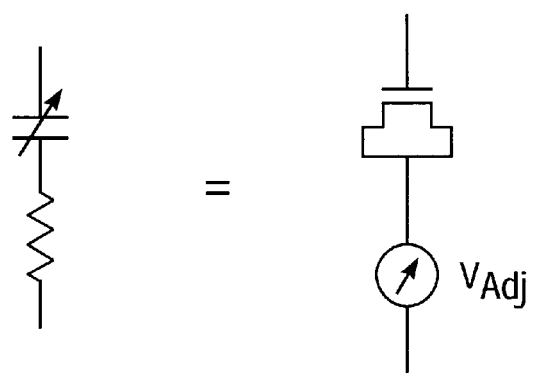
FIG. 6 further illustrates one embodiment of the variable capacitor element of FIG. 5.

Variable capacitor element 54 may be implemented in many forms. For example, an array of linearly weighted or binary weighted transistors might be selectively actuated to effect a variable capacitance. Alternatively, a MOS (metal-oxide semiconductor) transistor and a controlling voltage source may be used to implement the variable capacitor element 54. This approach is illustrated in FIG. 6. Using the approach shown in FIG. 6, an adjustment in the controlling voltage Vadj will vary the capacitance between the MOS gate structure and the substrate of the integrated circuit incorporating the MOS transistor. The series resistance associated with the MOS transistor will also vary with changes in Vadj. However, this should not be a problem since the amount of capacitance variation supplied by variable capacitor element 54 is relatively small in relation to total device capacitance Ci. Variable capacitor 54 may also be implemented by using an array of capacitors connected to the connection circuit through switches. By switching one or more capacitors in or out of the array, capacitance may be changed.

Normally, Ci/pitch is larger than $L_{PCB}$ and the channel impedance is dominated by $L_{PCB}$ and Ci. Accordingly, compensation for variations of +/−10% in the value of $L_{PCB}$ may be made by varying Ci by +/−10%. Further, the degree of variation provided by the variable capacitor element may be relatively coarse, in the range of 5% of Ci, i.e, a five step compensation scale covers +/−10% of Ci. This degree of variation is sufficient to reduce channel impedance variations from the +/−10% to about +/−2.5%.

Where the variable capacitance element is implemented as an array of switchable elements (transistors or capacitors) a digital control signal may be applied to selectively switch elements in or out of the circuit. The digital control signal may be derived from a control value stored in a control register on the slave device. Where the variable capacitance element uses an analog control signal, a digital to analog (D/A) converter may be used.

Figure 7:
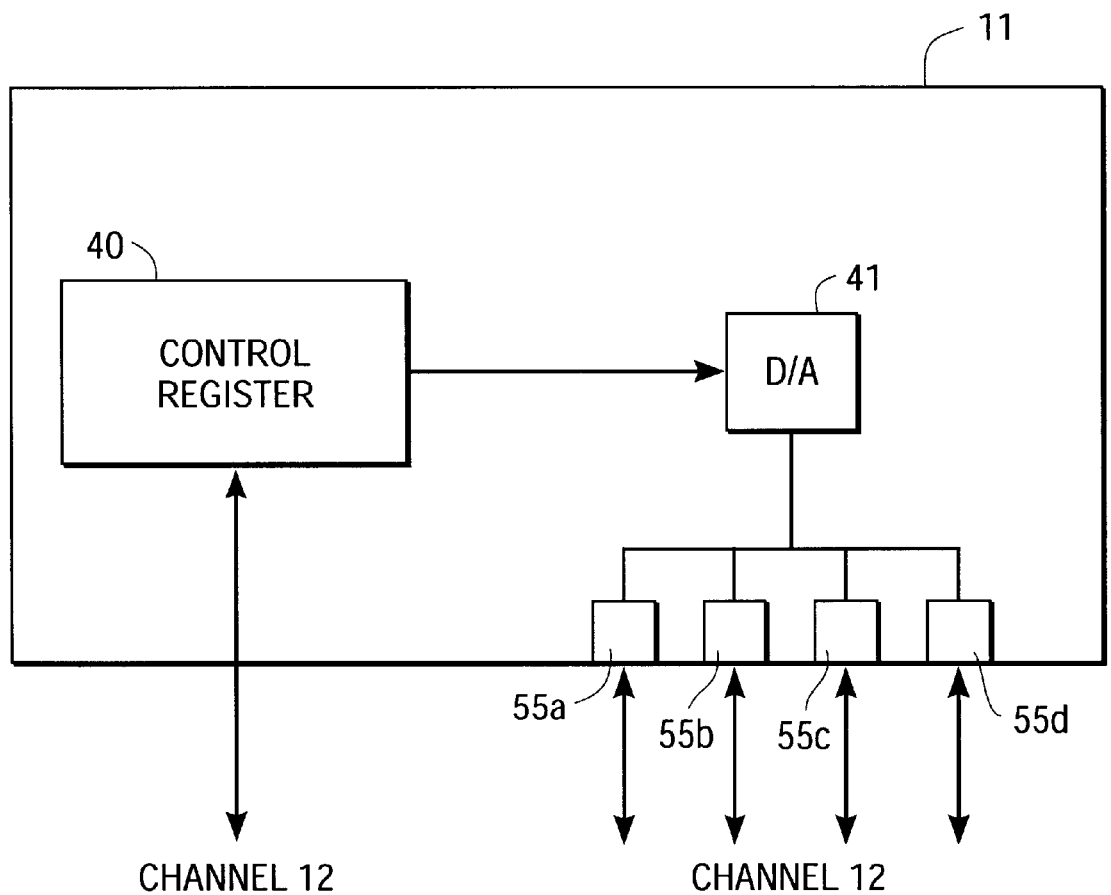
FIG. 7 illustrates an exemplary circuit within a slave device for programming the value of one or more variable capacitor elements.

FIG. 7 illustrates one example of a circuit within a slave device which is capable of "defining" a selected capacitance for a variable capacitor element associated with a connection circuit for each one of pins 55a, 55b, 55c, and 55d. In FIG. 7, one of more control value(s) are determined by the master. A single common control value may be defined for all signal line connections by a slave device, or multiple control values may be defined for individual signal line connections. The one or more control values are typically defined during bus system initialization. Once defined the control value(s) is communicated from the master to control register 40 resident in the slave device. Alternatively, control register 40 may be placed in the master.

As presently preferred, the control value stored in control register 40 is applied to one or more variable capacitor elements in the connection circuits associated with slave device 11. Depending on the nature of the variable capacitor elements a digital, or an analog control signal derived from the stored control value is applied to the one or more variable capacitor elements. As illustrated in FIG. 7, a common digital control value stored in control register 40 is converted into analog form by D/A converter 41 and applied to respective MOS transistors in connections circuits associated with pins 55a, 55b, 55c, and 55d.

Potential programming techniques proposed by the present invention take full advantage of existing bus system capabilities. For example, conventional slave devices typically incorporate a serial programming device (SPD). A wide variety of information regarding the nature and the expected performance characteristics for the slave device may be programmed into the SPD by the slave device manufacturer. During bus system initialization, a master typically reads the SPD information and configures the slave device and the bus system in relation to the SPD information.

Accordingly, one might measure the channel impedance once a slave device is mounted on the PCB and connected to the channel. The measured channel impedance can then be compared to a target impedance and a control value determined by this comparison. The control value can thereafter be stored in the SPD. During bus system initialization, a master may read the control value stored in the SPD and store this value in a control register.

In order for this scheme to work well, the slave devices should be closely matched in their electrical characteristics. Pin to pin capacitance variations on a slave device, as well as slave device to slave device capacitance variations on a module connected to the PCB should be much smaller than the capacitance variation to be compensated. Further, where PCB process variations are relatively small within the same PCB manufacturing batch, channel impedance measurements may be made infrequently.

Figure 8:
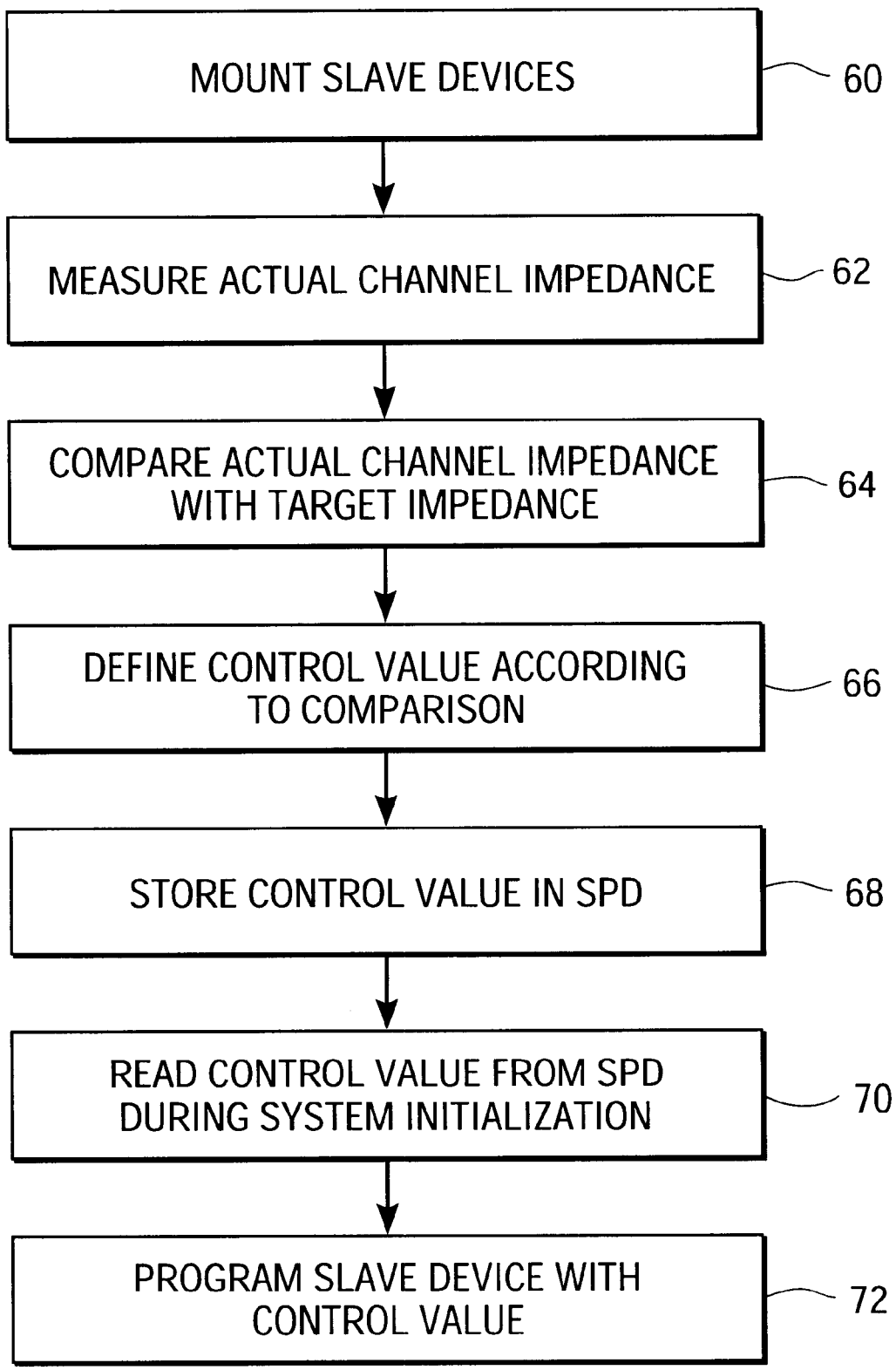
FIG. 8 is a flowchart describing a method for programming an impedance compensation circuit in a slave device based on measured channel impedance values.

The foregoing method is summarized in the flowchart of FIG. 8. The method comprises: mounting the slave devices 60; measuring the actual channel impedance of the mounted slave devices 62; comparing the measured actual channel impedance with a target impedance 64;

defining a control value in relation to the comparison 66; storing the control value in the slave device SPD 68; reading the control value from the SPD during system initialization 70; and programming the slave device with the control value 72.

Although the foregoing method is simple to implement and should be sufficient for many applications, it is not capable of effectively defining control values on a signal line by signal line basis. Further, channel impedance compensation is dependent on manual measurements which are tedious and prone to error. A more sophisticated programming scheme involves a master capable of transmitting a telemetry signal down a particular signal line and "listening for echoes" of this signal caused by impedance discontinuities on the channel.

In one possible embodiment, the master transmits a single step or single pulse signal down a signal line and thereafter samples the signal line for one or more responses during a time period sufficiently long to expose all potential signal reflections. Thus, in a manner very consistent with the operating principles of time-domain reflectometry (TDR), an "impedance map" for the channel is developed. Once the impedance map is developed, the master may manipulate the control value stored in each slave device control register to minimize signal reflections.

Figure 9:
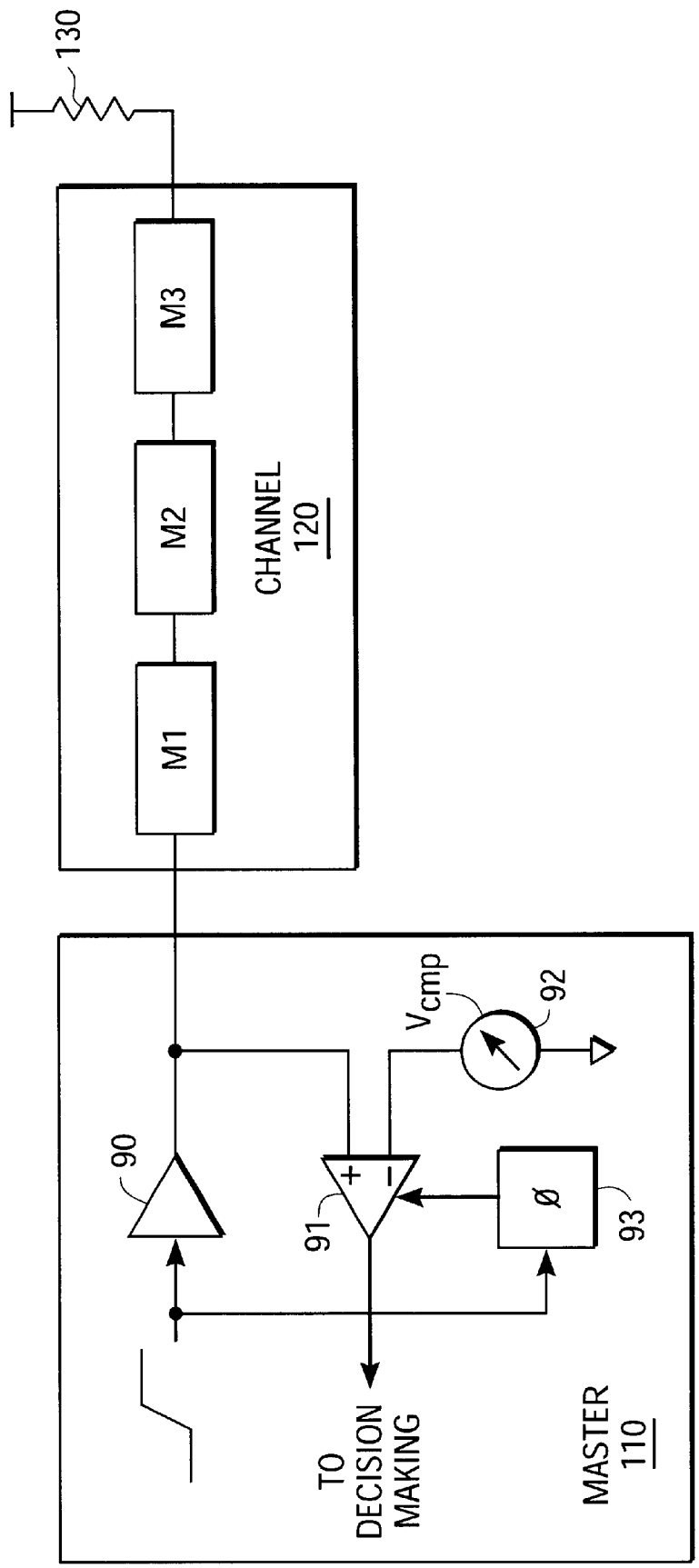
FIG. 9 is a diagram of an exemplary bus system further incorporating means for automatically determining channel impedance control values on a signal line by signal line basis using a telemetry signal and signal reflection detection and evaluation circuitry.
Figure 10:
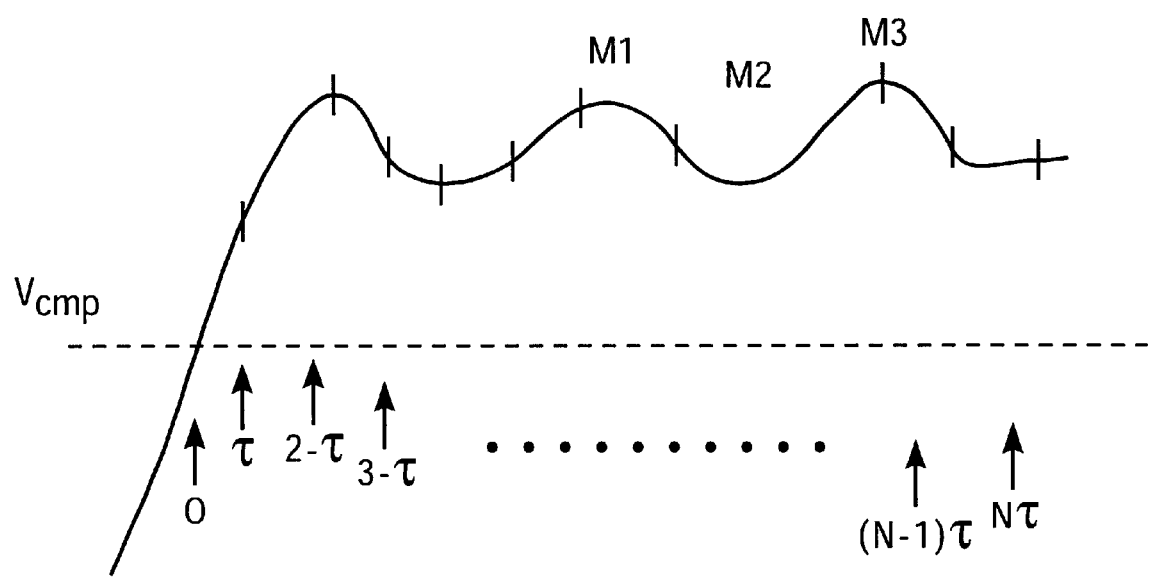
FIG. 10 is a hypothetical waveform resulting from of multiple signal reflections received in the system of FIG. 9.

This method will be further explained in relation to FIG. 9 and FIG. 10. FIG. 9 illustrates a exemplary bus system comprising a master 110 and termination resistors 130 connected via channel 120. Three (3) modules M1, M2, and M3 are connected to one or more signal lines of channel 120. Master 110 incorporates an output driver 90 transmitting a telemetry signal over channel 120. The telemetry signal will induce reflections at impedance discontinuities along channel 120.

Figure 3:
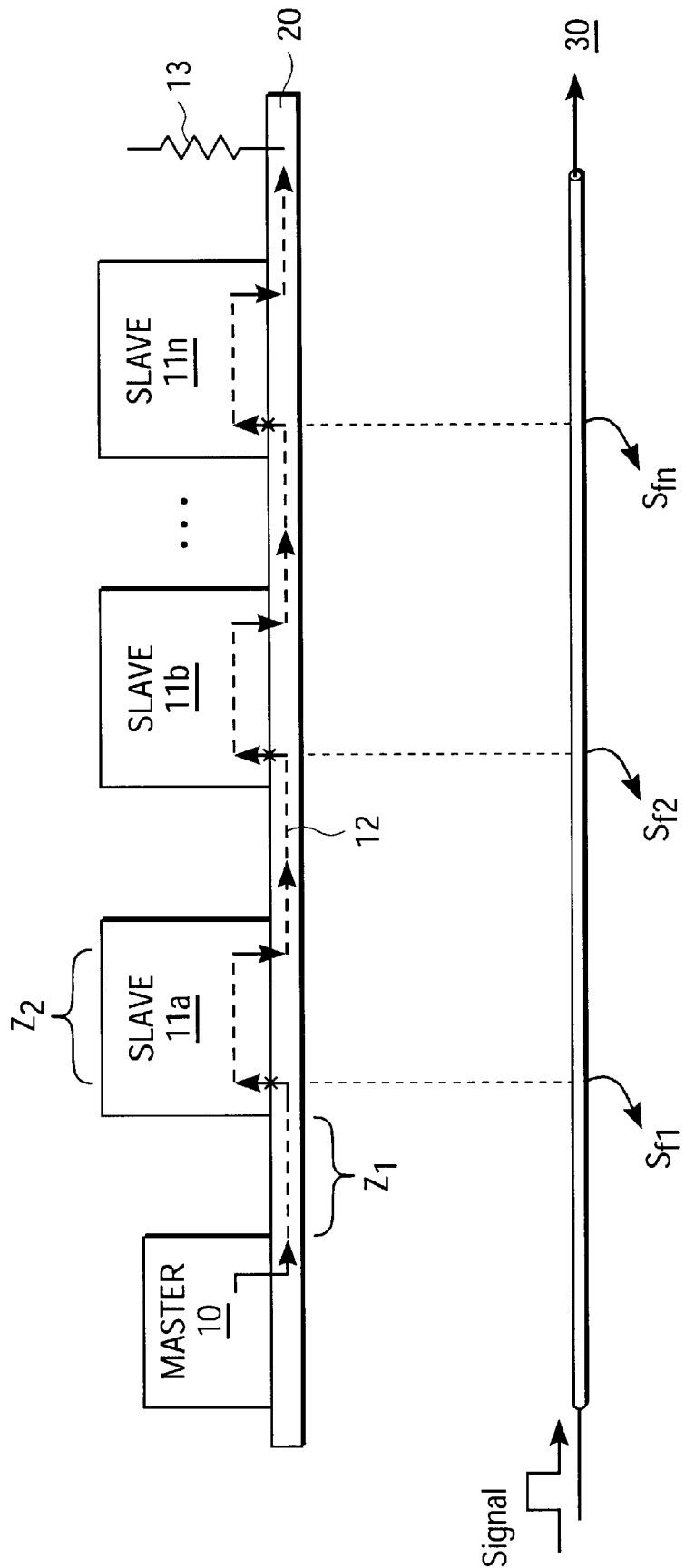
FIG. 3 illustrates the problem of multiple signal reflections as a result of impedance discontinuities in relation to the exemplary bus system.
Figure 4A:
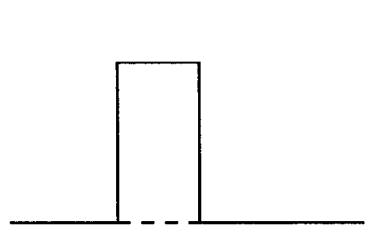
FIGS. 4A and 4B, as well as FIGS. 4C and 4D, illustrate the noise effects of unwanted signal reflections on various input signals.
Figure 4B:
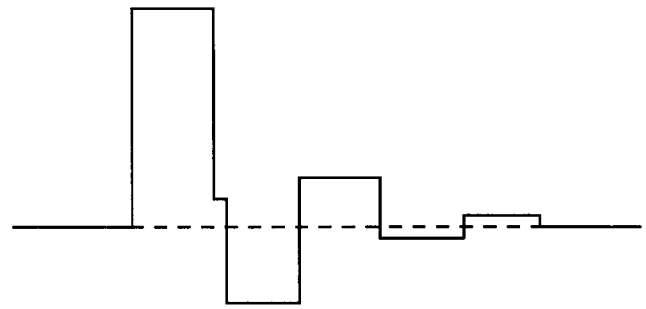
Figure 4C:
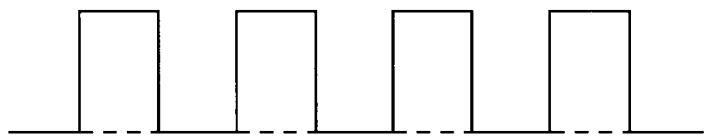
Figure 4D:
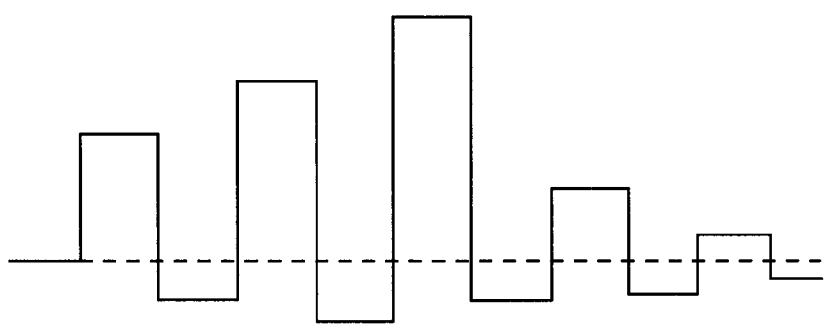

The multiple signal reflections return to master 110 in a sequence such as the one shown in FIG. 10. FIG. 10 shows a voltage waveform as a function of time in relation to a nominal comparison voltage (Vcmp) and in relation to a delay τ which should be smaller than the delays of the various impedance segments (e.g., Z1 and Z2 of FIG. 3) forming the channel.

In the exemplary embodiment illustrated in FIG. 9, signal reflections may be "zeroed out" one by one. That is, a first signal reflection associated with a first impedance discontinuity caused by the signal line transition from the PCB to module M1 is detected at sampler (comparator) 91. Sampler 91 also receives Vcmp from adjustable voltage source 92. A delay τ is first selected from the sampling trigger circuit 93, then Vcmp is increased gradually from a baseline voltage until the input sampler 91 detects a voltage transition from logical 1 to 0, the decision making circuit or program then records the voltage level of Vcmp and stores it as V(1). The foregoing procedure is repeated for different delay periods 2τ, 3τ, . . . nτ, where nτ is larger than the maximum round trip delay for signals traversing the bus. The corresponding Vcmp levels are stored as V(2), V(3), . . . V(n). Since nτ is larger than the round trip delay of the bus system, the value V(n) consists of only the DC level of the bus signal without any reflection noise. An ideal channel without any impedance mismatches will produce V(1)=V(2)=V(3) . . . =V(n).

The decision making circuit or program then adjusts the variable capacitance on the modules one by one to minimize the reflection noise observed by the sampler. For example, all possible control values are tried for the first module, and the one yielding a minimum value for the equation $\Sigma\{|V(i)-V(n)|\}$, where i varies from 1 to n, is stored in the first modules' control register. The same procedure is repeated for all other modules.

Knowledge of the variable delay in sampling the signal reflection waveform, as provided by sampling trigger circuit 93, allows decision making circuitry in master 110 (or elsewhere in the bus system) to identify the module-to-PCB connection causing the impedance discontinuity. In other words, the decision making circuitry may use the known relationship between the physical distance on the channel between the master and a given module and the resulting time required for a signal reflection to return to the master to identify which module-to-PCB connection (or other source of impedance discontinuity) relates to a given signal reflection. With knowledge of the compensation voltage level (Vcmp) required to minimize the detected signal reflection, the decision making circuitry is able to define a control value for the one or more variable capacitor element (s) associated with the module. This control value may then be written to the control register of the module.

This method may be individually applied to each signal line connection for each module. As a result, each connection between a slave device (or a module holding one or more slave devices) and a channel signal line may be optimally adjusted within the precision afforded by the number or range of variations for the control value. Further, this method is automated and requires no human intervention, such as may be required for impedance measurements.

The foregoing illustration is just one specific example of how channel impedance discontinuities may be detected, sampled, evaluated, and compensated. In the example, a single step telemetry signal is used. However, a pseudo-random data sequence might be used to obtain a more complex, view of the channel's response to a data signal. The system "voltage margin" can be measured by sending and receiving pseudo-random data between the master and slave devices while moving Vcmp up or down until the received data is different from that transmitted. The decision making circuit or program then adjusts the finite possibilities of the variable capacitor on the modules until maximum margin is reached.

Figure 11:
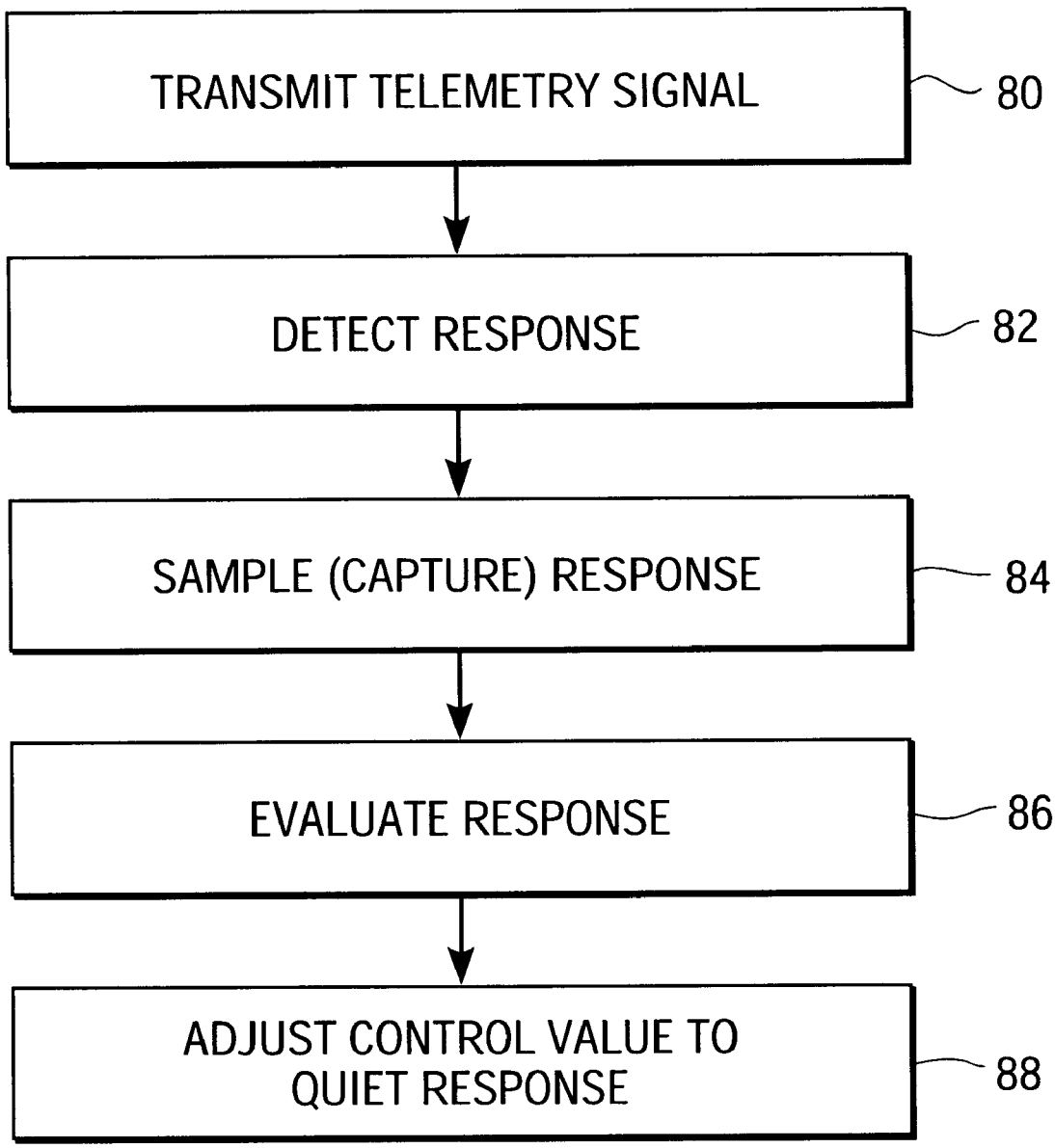
FIG. 11 is a flowchart describing a general method for determining and programming channel impedance control values.

A more general application of the inventive method taught by the foregoing example is summarized in the flowchart of FIG. 11. The method consists of: transmitting a telemetry signal down one or more signal lines on the channel 80; listening for (or detecting) a response to the telemetry signal 82; sampling (or otherwise capturing) the response 84; evaluating the response 86; and adjusting the control value of an associated compensation circuit to quiet the response 88.

The disclosed connection circuit capable of compensating for PCB variation and the associated methods for determining and programming a control value for the connection circuit are particularly well adapted for high speed memory systems. The automated approach to determining and programming the impedance compensation control value(s) may come at considerable overhead, depending on the level of desired channel impedance optimization. The implementation of the functionality necessary to yield certain levels of channel impedance optimization may require too much die space for the functionality to be incorporated into a conventional memory controller or other standard sized master. Thus, it may be cost effective to implement only the basic circuitry in the master and allow the system level software such as BIOS to run the channel impedance optimization routine.

As data bandwidth requirements and associated system clock speeds increase, channel impedance discontinuities become more and more intolerable. The present invention may be scaled to need. That is, the number, nature and size of the slave devices connected to the channel, as well as the length, transmission speed, and composition of the channel signal lines forming the channel may be taken into consideration when designing the active impedance compensation system and method. The foregoing embodiments are merely teaching examples for the present invention which is defined by the attached claims.

What is claimed is:

1. A circuit for use in a bus system comprising a master connected to at least one slave device via a plurality of printed circuit board (PCB) signal lines, the circuit comprising;
   a connection circuit located within the slave device and coupled to an input/output (I/O) pin of the slave device, the I/O pin to be coupled to a PCB signal line of the plurality of PCB signal lines; the circuit including:
   an output transistor to drive data from the slave device onto the PCB signal line; and,
   a variable capacitor element coupled to the I/O pin and responsive to a control signal corresponding to a control value received from the master so as to adjust the impedance of the connection circuit by adjusting the capacitance of the variable capacitor element in accordance with the control value.

2. The circuit of claim 1, further comprising:
   an electro-static discharge circuit connected to the I/O pin.

3. The circuit of claim 1, further comprising a control register storing the control value, wherein the control value is derived by the master by reading a value from a serial programming device (SPD) on the slave device.

4. The circuit of claim 1, wherein the variable capacitor element comprises a metal-oxide semiconductor (MOS) transistor controlled by the control signal.

5. The circuit or claim 1, wherein the control signal is an analog control voltage generated by a digital-to-analog converter receiving the control value from a control register in the slave device.

6. The circuit of claim 1, wherein the variable capacitor element comprises an array of transistors selected in accordance with the control signal.

7. The circuit of claim 1, wherein the variable capacitor element comprises an array of capacitors selected in accordance with the control signal.

8. A method of impedance compensation in a bus system comprising a waster and a slave device mounted on a printed circuit board (PCB) and connected via a plurality of signal lines, the method comprising:
   at the master, measuring the actual impedance of the mounted slave device;
   at the master, comparing the actual impedance to a target impedance;
   at the master, defining a control value in accordance with a comparison of the actual impedance to the target impedance;
   at the master, sending the control value to the slave device for storage in a serial programming device (SPD) on the slave device; and
   at the slave device, adjusting the impedance of one or more connection circuits on the slave device in response to the control value.

9. The method of claim 8, further comprising:
   at the master, reading the control value from the SPD during an initialization routine;
   under control of the master, storing the control value in a control register on the slave device.

10. A method of determining and programming an impedance compensation circuit in a slave device in a bus system comprising a master and the slave device connected via a channel, the method comprising;
   at the master, transmitting a telemetry signal onto the channel;
   at the master, detecting a response to the telemetry signal in the master;
   at the master, evaluating the response to generate impedance compensation information;
   at the master, sending the impedance compensation information to the slave device; and
   at the slave device, adjusting the impedance of a connection circuit on the slave device in response to the impedance compensation information sent by the master.

11. The method of claim 10 wherein the slave device comprises a control register and the impedance compensation circuit, wherein the impedance compensation circuit comprises a variable capacitor element, and wherein the step of programming the impedance compensation circuit in accordance with the evaluation of the response further comprises;
   at the master, determining a control value in accordance with the evaluation of the response;
   under control of the master, storing the control value in the control register;
   defining a control signal within the slave device in accordance with the control value; and
   adjusting the capacitance of the variable capacitor element in response to the control signal.

12. The method of claim 10, wherein the step of transmitting a telemetry signal comprises transmitting at least one of a single step signal and a single bit signal.

13. The method of claim 10 wherein the step of transmitting a telemetry signal comprises transmitting a pseudo-random data signal.

14. The method of claim 10 wherein the step of detecting a response to the telemetry signal further comprises:
   detecting one or more signal reflections caused by inter-reaction of the telemetry signal with one or more impedance discontinuities in the channel.

15. The method of claim 14 wherein the step of detecting one or more signal reflections further comprises:
   applying the detected one or more signal reflections to one port of a two port sampler/comparator.

16. The method of claim 15 wherein the step of evaluating the response further comprises;
   generating an adjustment voltage which when applied to a second port of the two port sampler/comparator minimizes or maximizes the voltage output of the sampler/comparator, and
   determining a control value corresponding to the adjustment voltage.

17. The method of claim 14 wherein the slave device further comprises a control register and a variable capacitor element, and wherein the step of programming the impedance compensation circuit further comprises:
   writing the control value into the control register;
   generating a control signal from the control value; and,
   applying the control signal to the variable capacitor element.

18. The method of claim 17 wherein the variable capacitor element comprises an array of transistors, and wherein the control signal comprises a digital word defined by the control value which selects certain transistors in the array of transistors.

19. The method of claim 17 wherein the variable capacitor element comprises an array of capacitors, and wherein the control signal comprises a digital word defined by the control value which selects certain capacitors in the array of capacitors.

20. A slave device connected to a master via a high-speed bus, the slave device comprising:
   an input/output (I/O) pin, within the slave devices connected to a first signal line of the high-speed bus;
   means within the slave device for receiving a control signal received from a master via one or more signal lines of the high-speed bus;
   a variable capacitor element located within the slave device and responsive to the control signal such that a change in the control signal causes a change in the impedance presented by the I/O pin to the first signal line of the high-speed bus.

21. The slave device of claim 20, wherein the I/O pin comprises an input-only pin adapted to receive data from the signal line.

22. The slave device of claim 20, wherein the slave device further comprises an output transistor adapted to drive data onto the signal line.

23. A bus system comprising;
   a master connected to a slave device via a bus;
   the slave device comprising at least one input/output (I/O) pin connected to a signal line associated with the bus, and a variable capacitor element connected to the at least one I/O pin for adjusting impedance of a connection circuit of the slave device, the connection circuit connected to the at least one I/O pin;
   wherein the variable capacitor element of the slave device is responsive to a control signal received from the master via the bus to vary the impedance at the at least one I/O pin.

24. The bus system of claim 23, wherein the master further comprises:

a circuit adapted to drive a telemetry signal onto the bus;

a circuit generating a reference signal;

a sampler circuit detecting signal reflections induced on the bus by the telemetry signal, comparing the signal reflections to the reference signal, and communicating the comparison to a decision making element.

25. The bus system of claim 24, wherein the reference signal generating circuit is responsive to the decision making element to vary the reference signal.

26. The bus system of claim 25, wherein the decision making element is external to the master.

27. A method of impedance compensation in a bus system comprising a master and a slave device mounted on a printed circuit board (PCB) and connected via a plurality of signal lines, the method comprising:

at the slave device, driving data from the slave device onto a first PCB signal line of the plurality of PC signal lines via an input/output (I/O) pin of the slave device; and at the slave device, receiving a control signal from the master via one or more of the plurality of PCB signal lines, and adjusting the capacitance of a variable capacitor element in the slave device in accordance with the control signal so as to adjust the impedance of a connection circuit of the slave device with respect to the first PCB signal line.

28. The method of claim 27, including storing a control value in a control register in the slave device, the control value corresponding to the control signal sent by the master, and adjusting the capacitance of a variable capacitor element in the slave device in accordance with the control value stored in the control register.

29. The method of claim 27, including storing a control value in a register in the slave device, and conveying the control value to the master, wherein the control signal is derived by the master by reading the control value from the control register.

30. A slave device connected to a master via a high-speed bus, the slave device comprising:

an input/output (I/O) pin within the slave device connected to a first signal line of the high-speed bus;

means within the slave device for receiving a control signal received from a master via one or more signal lines of the high-speed bus;

a control register within the slave device for storing a control value in accordance with the control signal received from the master;

a variable capacitor element located within the slave device and responsive to the control value such that a change in the control value causes a change in the impedance presented by the I/O pin to the first signal line of the high-speed bus.

* * * * *

UNITED STATES PATENT AND TRADEMARK OFFICE
CERTIFICATE OF CORRECTION

PATENT NO.    : 6,530,062 B1
DATED         : March 4, 2003
INVENTOR(S)   : Liaw et al.

It is certified that error appears in the above-identified patent and that said Letters Patent is hereby corrected as shown below:

<u>Column 9</u>,
Line 12, delete "waster" and insert -- master --; and

<u>Column 11</u>,
Line 19, delete "PC" and insert -- PCB --.

Signed and Sealed this

Third Day of August, 2004

JON W. DUDAS
*Acting Director of the United States Patent and Trademark Office*